United States Patent [19]

Hassler et al.

[11] Patent Number: 5,463,366
[45] Date of Patent: Oct. 31, 1995

[54] CURRENT LIMITING FUSE AND DROPOUT FUSEHOLDER

[75] Inventors: Stephen P. Hassler, Muskego, Wis.; Stephen P. Johnson, Olean, N.Y.; John Lapp, Franklin, Wis.

[73] Assignee: Cooper Industries, Inc., Houston, Tex.

[21] Appl. No.: 174,594

[22] Filed: Dec. 27, 1993

Related U.S. Application Data

[63] Continuation-in-part of Ser. No. 946,961, Sep. 17, 1992, Pat. No. 5,274,349, and a continuation-in-part of Ser. No. 67,512, May 24, 1993, and a continuation-in-part of Ser. No. 65,439, May 24, 1993.

[51] Int. Cl.⁶ .................. H01H 71/10; H01H 71/08; H01H 85/04; H01H 85/38
[52] U.S. Cl. .................. 337/176; 337/170; 337/181; 337/159; 337/293; 337/274
[58] Field of Search ................. 337/158–162, 337/168–181, 229, 274, 292, 293

[56] References Cited

U.S. PATENT DOCUMENTS

| | | | |
|---|---|---|---|
| 3,437,971 | 4/1969 | Mikulecky | 337/158 |
| 3,611,240 | 10/1971 | Mikulecky | 337/178 |
| 3,680,019 | 7/1972 | Kozacka | 337/161 |
| 3,755,769 | 8/1973 | Mikulecky | 337/158 |
| 3,774,137 | 11/1973 | Carothers | 337/174 |
| 3,813,627 | 5/1974 | Koch | 337/274 |
| 3,825,871 | 7/1974 | Blewitt | 337/171 |
| 3,827,010 | 7/1974 | Cameron et al. | 337/168 |
| 3,863,187 | 1/1975 | Mahieu et al. | 337/162 |
| 3,913,050 | 10/1975 | Mikulecky | 337/159 |
| 4,001,749 | 1/1977 | Kozacka | 337/244 |
| 4,011,537 | 3/1977 | Jackson, Jr. et al. | 337/171 |
| 4,028,655 | 6/1977 | Koch | 337/160 |
| 4,114,128 | 9/1978 | Cameron | 337/162 |
| 4,123,738 | 10/1978 | Huber | 337/159 |
| 4,134,094 | 1/1979 | Huber | 337/292 |
| 4,158,830 | 6/1979 | Biller et al. | 337/248 |
| 4,184,138 | 10/1980 | Beard et al. | 337/168 |
| 4,336,521 | 6/1982 | Kozacka et al. | 337/252 |
| 4,388,603 | 6/1983 | Hassler | 337/158 |
| 4,414,527 | 11/1983 | Biller | 337/180 |
| 4,481,495 | 11/1984 | Jarosz et al. | 337/159 |
| 4,506,249 | 3/1985 | Huber et al. | 337/232 |
| 4,540,968 | 9/1985 | Kato et al. | 337/31 |
| 4,542,363 | 9/1985 | Kato et al. | 337/31 |
| 4,570,146 | 2/1986 | Huber et al. | 337/158 |
| 4,625,196 | 11/1986 | Muench et al. | 337/212 |

*Primary Examiner*—Leo P. Picard
*Assistant Examiner*—Stephen T. Ryan
*Attorney, Agent, or Firm*—Gregory L. Maag; Conley, Rose & Tayon

[57] ABSTRACT

A current-limiting dropout fuseholder includes multiple current paths through the fuse body. A primary current path includes a high current fusible element. A secondary current path in parallel with the primary path includes a triggering conductor that extends outside the fuse body and is connected to a moveable support. The second current path further includes a first spark gap for severing the triggering conductor upon the occurrence of a fault and the shifting of the fault current from the primary current path to the second current path. A second spark gap formed between the primary and the second current paths ensures that the fault current flows across the first spark gap for a time sufficient to sever the triggering conductor, thereby ensuring that dropout will occur.

21 Claims, 4 Drawing Sheets

CURRENT LIMITING FUSE AND DROPOUT FUSEHOLDER

This application is a continuation-in-part of the following U.S. patent applications: Ser. No. 07/946,961, filed Sep. 17, 1992; Ser. No. 08/067,512, filed May 24, 1993; and Ser. No. 08/065,439, filed May 24, 1993.

FIELD OF THE INVENTION

The present invention relates generally to electrical power distribution apparatus. More particularly, the invention relates to current limiting fuses and to dropout style fuseholders. Still more particularly, the invention relates to a current limiting dropout fuseholder which includes multiple current paths and which shifts the current flowing through the fuseholder between the various paths to aid in the dropout process, the fuseholder being particularly adapted for installation in the industry-standard interchangeable cutout mountings that are presently used with expulsion fuses.

BACKGROUND OF THE INVENTION

A fuse is a current interrupting device which protects a circuit by means of a current-responsive fusible element. When an overcurrent or short-circuit current of a predetermined magnitude and duration is conducted through the use, the fusible element melts, thereby opening the circuit. After having interrupted an overcurrent, the fuse must be located and replaced in order to restore service.

Fuses are typically employed in the electrical utility industry to protect distribution transformers, cables, capacitor banks and other equipment from damaging overcurrents. The fuses are arranged to disconnect the faulted equipment or circuit promptly from its source of supply before damage can occur. At the present time, two basic types of fuses are employed, the expulsion fuse and the current limiting fuse.

The earliest of these two types of fuses was the expulsion fuse. An expulsion fuse typically employs a relatively short length of a fusible element (within what is commonly termed a "fuselink") contained within a tubular enclosure that is part of a larger assembly known as a "fuseholder". The enclosure used in the expulsion type fuse is lined with an organic material, such as bone fiber. Interruption of an overcurrent takes place within the fuse by the deionizing and explosive action of the gases which are liberated when the liner is exposed to the heat of the arc that is created when the fusible element melts in response to the overcurrent. The operation of the expulsion-type fuse is characterized by loud noise and violent emission of gases, flame and burning debris, all of which pose a danger to personnel who may be in close proximity to the fuse when it operates. Because of its violent mode of operation, this type of fuse has generally been restricted to outdoor usage only. Even when employed outdoors, the expulsion fuse must be mounted well away from the equipment it is intended to protect, as well as other equipment, due to the explosive nature of its operation and its tendency to inject ionized gases into insulating spaces. Further, expulsion fuses mounted on distribution system poles have been known to initiate grass fires resulting from the flaming debris which may be expelled.

Another inherent disadvantage of the expulsion type fuse is that it requires ½ or sometimes 1 full cycle of current before the fuse clears a high current fault. During this time, the equipment the fuse is designed to protect must endure the full available fault current that is allowed to pass through the fuse to the equipment. Potentially damaging energy that will be dissipated in the equipment will be proportional to the formula $I^2T$, where I is the magnitude of the overcurrent and T is the time that the current condition exists. Additionally, the high current that an expulsion fuse allows to flow prior to its interruption at a system current zero tends to cause bothersome voltage dips upon the network, causing lights to flicker and sensitive computers and electronic equipment to suffer. Further, expulsion fuses may not clear the overcurrent condition soon enough to prevent sectionalizing fuses, reclosers or other protective relays and circuit devices from also sensing the overcurrent and responding by temporarily and sometimes permanently disconnecting other portions of the network. Additionally, the increased demand for electrical service has led to lower impedance distribution networks and the need for greater interrupting capabilities, capabilities which sometimes exceed those available through the use of expulsion fuses.

The limited interrupting capacity of expulsion-type fuses, coupled with their potentially dangerous mode of operation, their unsuitability for use within buildings or enclosures, their relatively slow clearing time, as well as other factors, prompted the development of the current limiting fuses. The current-limiting fuse has at least three features that have made it extremely desirable for use by the utilities:

(1) Interruption of overcurrents is accomplished quickly without the expulsion of arc products or gases or the development of forces external to the fuse body because all the arc energy of operation is absorbed by the sand filler of the fuse and is subsequently released as heat at relatively low temperatures. This enables the current-limiting fuse to be used indoors, or even in small enclosures. Furthermore, since there is no discharge of hot gases or flame, only normal electrical clearances from other apparatus need to be provided.

(2) A current-limiting action or reduction of current through the fuse to a value less than that otherwise available from the power-distribution network at the fuse location occurs if the overcurrent greatly exceeds the continuous-current rating of the fuse. Such a current reduction reduces the stresses and possible damage to the circuit up to the fault or to the faulted equipment itself, and also reduces the shock to the distribution network.

(3) Very high interrupting ratings are achieved by virtue of its current-limiting action so that current-limiting fuses can be applied on medium or high-voltage distribution circuits of very high available short-circuit currents.

A current-limiting fuse typically consists of one or more fusible elements of silver wire or ribbon which are electrically connected at their ends to a pair of electrical terminations. The fusible elements require a minimum element length for proper fault current interrupting performance, and also require sufficient element cross sectional area in order to properly carry the normal or steady-state system currents. The assembly—consisting of the fusible element and end terminations—is placed in a tubular housing that is made of a highly temperature-resistant material, and the housing is then typically filled with high-purity silica sand and sealed. Terminals on the ends of the housing interconnect the fuse with the distribution network. The entire assembly is generally known as a current-limiting fuse.

When operating to clear a high magnitude fault current, the fusible element of a current limiting fuse melts almost instantaneously over its full length. If segments having reduced cross sectional areas are formed in the element, the element melts initially at these reduced area segments, followed by melting of the remaining length of the element.

The resulting arc rapidly loses heat energy to the surrounding sand. This energy melts or fuses the sand surrounding the element into a glass-like tunnel structure called a "fulgurite." The rapid loss of heat energy and the confinement of the arc by the molten glass fulgurite literally chokes off the current to a relatively small value. The current is quickly reduced to low levels, brought into phase with the system voltage and interrupted at the earliest-occurring current zero of the in-phase current.

Using a metallic ribbon as the high magnitude fusible element is quite common in higher current rated fuses. The ribbon form has the advantage over wire elements by having a larger surface area for thermal conductivity and radiation to the adjacent filler material. Consequently, for a given volume of conductor material, a ribbon element can have a higher steady-state ampere rating than a wire element, as well as improved interrupting characteristics. Ribbon also has the distinct advantage of lending itself to modification with perforations or notches in order to reduce its cross sectional area in order to provide the desired melt characteristics and exact arc-voltage generation control. When a current-limiting fuse using ribbon-type elements encounters a high-fault current, the ribbon portions having reduced cross-sectional area are heated rapidly to the melting point of the ribbon. This produces a fixed number of arclets in series and, thus, limits the magnitude of the arc-voltage spike produced at that instant. The ensuing arc formation continues to vaporize the remaining portions of the ribbon element and finally produces an arc which occupies the full length of the element path.

On low magnitude currents, such as those that might occur from high-impedance faults or sustained overloads, an entirely different phenomenon occurs. In these instances, the fusible element is heated slowly, and ultimately melts in a limited number or perhaps only one place. One or more short arcs begin and attempt to burn back longer sections of the fusible element. The very high heat of the arc again forms a fulgurite. However, because the initial arc length is short, and because the rate that the fusible element is burned back may not be fast enough to force a current interruption before the highly concentrated heat source destroys the effectiveness of the developed fulgurite, the fuse will fail to interrupt low magnitude currents. Consequently, to achieve interrupting capabilities for low magnitude fault currents, many of today's current limiting fuses employ a second fusible element in series with the primary element, where the second element is designed to fuse open in response to such low magnitude fault currents and to subsequently interrupt these currents.

Today, an important consideration to utilities in fuse selection and use relates to the ability of the fuse to be physically integrated within the utilities' existing network, and the ease and cost of installation and service. In present-day networks, expulsion fuseholders are typically installed in mountings which are known as "cutouts." Generally speaking, a cutout consists of a mounting having an insulating support designed to be mounted on a utility pole or crossarm and having a pair of spaced-apart terminals which are designed to receive and electrically engage a fuseholder, a switch assembly, or a combination thereof. When installed, the fuseholder or switch bridges the "gate" between the terminals of the cutout mounting.

The term "fuse cutout" usually refers to the combination of a cutout mounting, as described above, with a fuseholder. The fuseholder that is most typically employed in a fuse cutout is designed to be easily disengaged from the terminals of the cutout. One such fuseholder is the "dropout" type which is designed such that, upon actuation of the fuse, one end of the fuseholder becomes disengaged from the cutout mounting. When this occurs, the unrestrained end of the fuseholder rotates down and away from its normal bridging position between the mounting gate while the fuseholder remains supported from the mounting by its still-engaged end.

Expulsion type fuse cutouts offer a relatively convenient and low cost means of fusing, and thereby protecting electrical distribution systems. Further, the industry is adopting a dimensional standard for expulsion fuseholders and mountings, such that a fuseholder from one manufacturer will properly fit into the mounting of another manufacture. Further, these "interchangeable" cutouts are widely distributed throughout electrical distribution systems in this country, and large numbers of these cutouts are presently in service.

With increasing demands for electrical energy, more reliable service, higher levels of safety, the need for improved overvoltage protection of transformers and the desire for more compact systems, the continued use of expulsion fuse cutouts does not necessarily meet the needs of today's utilities. Many of the aforementioned problems associated with expulsion fuses could be overcome through the use of current-limiting fuses and fuseholder. However, the prior art current limiting fusing equipment has suffered from its own set of drawbacks.

Prior attempts to overcome some of the aforementioned problems are evidenced, for example, by the devices disclosed in U.S. Pat. Nos. 3,827,010 and 4,011,537. These devices provide a combination dropout assembly which include a current limiting fuse disposed in line and coupled in series with an expulsion-type fuse, such that a full range of protection is provided by the fuse cutout. However, the overall length of these devices is longer than the gate (the spacing between the terminals) of commonly used cutout mountings found in existing distribution systems. Thus, in order to effectively utilize these inventions, utilities would have to replace literally millions of cutouts presently in service. Such an approach would be prohibitive, not only from the standpoint of equipment cost, but also, and perhaps more significantly, in view of the monumental labor costs associated with the replacement of these cutouts. Further these devices do not adequately address or remedy fire hazards, spacing requirements, problems that may result from partial element damage to the series-connected device or the miscoordination which could occur when refusing one of the two series-connected sections.

Another prior art approach is illustrated in U.S. Pat. No. 3,863,187 which discloses an expulsion-type fuse in series with a current limiting fuse, but disposes the latter "outgate" such that it does not form a part of the dropout assembly. One shortcoming of this device is that the current limiting fuse is bolted in place, making replacement of the current limiting fuse difficult, particularly in adverse weather conditions. Compounding the difficulty is the fact that the network will typically be energized while maintenance personnel replace the fuse. Further, there is no method of readily determining whether the current limiting fuse has operated even where the expulsion fuse has operated and dropped open. Consequently, whenever the expulsion fuse portion of the device actuates, recommended practice is to replace both the expulsion fuse and the current limiting fuse. In addition, space, in excess of the normal expulsion fuse requirements, must be allocated for placement of the current limiting fuse. Also, proper electrical coordination of the two fuse sections must be maintained in order to ensure indication of a fuse operation and removal of voltage stress across the blown fuse by the dropout action of the expulsion fuse.

Still another fuse cutout is disclosed in U.S. Pat. No. 4,184,138 which discloses a design which contemplates offsetting the axes of a series-connected current limiting and expulsion fuse so that the combination will physically fit within existing interchangeable cutouts. However, like the three patents identified above, the invention suffers from many of the disadvantages inherent with the use of expulsion fuses, i.e., noise, expulsion of flaming arc products, coordination requirements, and the like. Additionally, the extra mounting hardware and mounting components for installing the apparatus is cumbersome and therefor undesirable. Further, as explained with respect to the U.S. Pat. No. 3,863,187, upon operation of the expulsion fuse, the current limiting fuse must also be tested, or replaced and later tested, thus eclipsing any significant cost savings.

Another prior art approach, one which does not rely on an expulsion fuse section, is shown in U.S. Pat. No. 3,611,240. This patent discloses a current limiting dropout fuseholder; however, the fuse is not designed to fit within the industry-standard interchangeable cutout mountings so prevalent in the industry today. Further, the dropout mechanism relies upon the use of an explosive charge which, upon detonation, releases the fuse for drop-open movement. Similarly, U.S. Pat. No. 3,825,871 also employs an explosive charge to initiate dropout of the fuse. Although such explosive charges have generally been successfully employed, it is not uncommon for such a fuse to fail to drop open after clearing a fault due to failure of the charge to detonate. Such failure is frequently due to the powder absorbing too much moisture to ignite after a prolonged period of service. No matter the reason for such failures, the failure of a dropout fuse to drop open after operation is a source of great frustration and delay as utility personnel are unable to locate the actuated fuses by simple visual observation, and must instead resort to more time consuming and less convenient means for detecting which fuses have operated. Further, the fuseholder that has failed to drop open remains subject to the voltage stress imposed by the energized network, making it susceptible to tracking and possible flash over.

Accordingly, despite the many advances made in fuse technology over the last decade, further advances would be welcomed by the industry. Specifically, due to the increased demand for use of current limiting fuses and the cost-driven necessity of employing existing cutout mountings, there exists a need for a full-range current limiting fuseholder sized so as to fit within the gate of interchangeable cutout mountings presently in-service. The current limiting fuseholder would be entirely of the nonexpulsion type to avoid potential danger to personnel, to eliminate the threat of starting a fire, and to allow the apparatus to be safely mounted closer to the protected equipment or to other structures, and would operate without the noise and voltage dip which accompanies expulsion fuse operation. Preferably, such a fuseholder would be of the dropout variety to provide indication of a fuse operation, to relieve voltage stress across a blown fuse and to allow ease of installation and maintenance. Ideally, the dropout mechanism would not be dependent upon an explosive charge for initiating the drop open movement of the fuseholder, but would be mechanically actuated and would consistently cause drop out in both low and high current-rated fuses on either low or high magnitude faults.

SUMMARY OF THE INVENTION

The present invention provides a current-limiting dropout fuseholder capable of full-range fault interruption and having multiple current paths through the fuseholder body. The fuseholder sequentially diverts the fault current into the various current paths so as to ensure reliable actuation of the dropout mechanism for all levels of fault current in lower current-rated fuseholders, such as those rated for approximately 12 amps and below. The invention is mechanically operable and is not dependent upon an explosive charge for initiating drop open movement of the fuseholder. The invention has the additional advantage of having a compact structure allowing the fuseholder to be mounted within the gate of the interchangeable cutout mountings presently in widespread use by electrical utilities.

The invention includes a fuse body having a first or primary current path between terminals on the fuse body, the path including a high current fusible element. The high current fusible element includes a first conducting segment having spaced-apart reduced area portions, in series with a second conducting segment that has the same $I^2T$ melting characteristics along its total length as the melting $I^2T$ characteristics of the reduced area portions of the first conducting segment. Where the first and second conducting segments are made from the same conducting material, such as silver, then the $I^2T$ melting characteristics of the segments are matched by providing a second segment that has a cross sectional area substantially the same as the cross sectional area of the reduced area portions of the first conducting segment. The invention further includes a second current path in parallel with the first, and a means for diverting fault current from the first current path into the second current path as the high current fusible element melts. The second current path includes a triggering conductor extending outside of the fuse body and attached to a supporting latch which is moveable between a supporting and nonsupporting position beneath the fuse body. A first spark gap is formed between the triggering conductor and a conducting portion of the lower terminal. When the fault current is diverted into the second current path, the spark gap will begin to conduct. The arcing across this first gap will tend to burn and sever the triggering conductor so as to release the latch member and allow dropout of the fuseholder to occur. To ensure that fault current flows across the first spark gap for a time sufficient to sever the triggering conductor in the lower current-rated fuseholders, a second spark gap is provided between the first current path and the second current path. Preferably, the second spark gap is formed between the first and second current paths at the junction between the first and second conducting segments of the high current fusible element. This second spark gap creates a third current path through the fuseholder, the third path comprising the first conducting segment of the high current fusible element, the second spark gap, the lower portions of the second current path and the first spark gap. The third current path ensures that, whatever current exists between the time the fault current switches to the second current path and the time the fault current is totally interrupted, that current will be conducted across the first spark gap so as to assist in severing the triggering conductor.

Thus, the present invention comprises a combination of features and advantages which enable it to substantially advance fuse and fuseholder technology by providing a full range, current-limiting dropout fuseholder which may be employed in the industry standard interchangeable cutout mounting, and which will drop out of its mounting upon actuation of the fuse without the necessity of relying upon an explosive charge. Further, the invention will cause dropout to occur with both low and high magnitude fault currents, in both low current-rated and high current-rated fuseholders. These and various other characteristics and advantages of the present invention will be readily apparent to those skilled in the art upon reading the following detailed description and referring to the accompanying drawings.

BRIEF DESCRIPTION OF THE DRAWINGS

For a detailed description of the preferred embodiments of the invention, reference will now be made to the accompanying drawings wherein:

FIG. 4 is a top view of the connective member of the lower cap and hinge assembly shown in FIG. 3;

FIG. 5 is a side view of the connective member shown in FIG. 4;

DESCRIPTION OF THE PREFERRED EMBODIMENT

Figure 1:
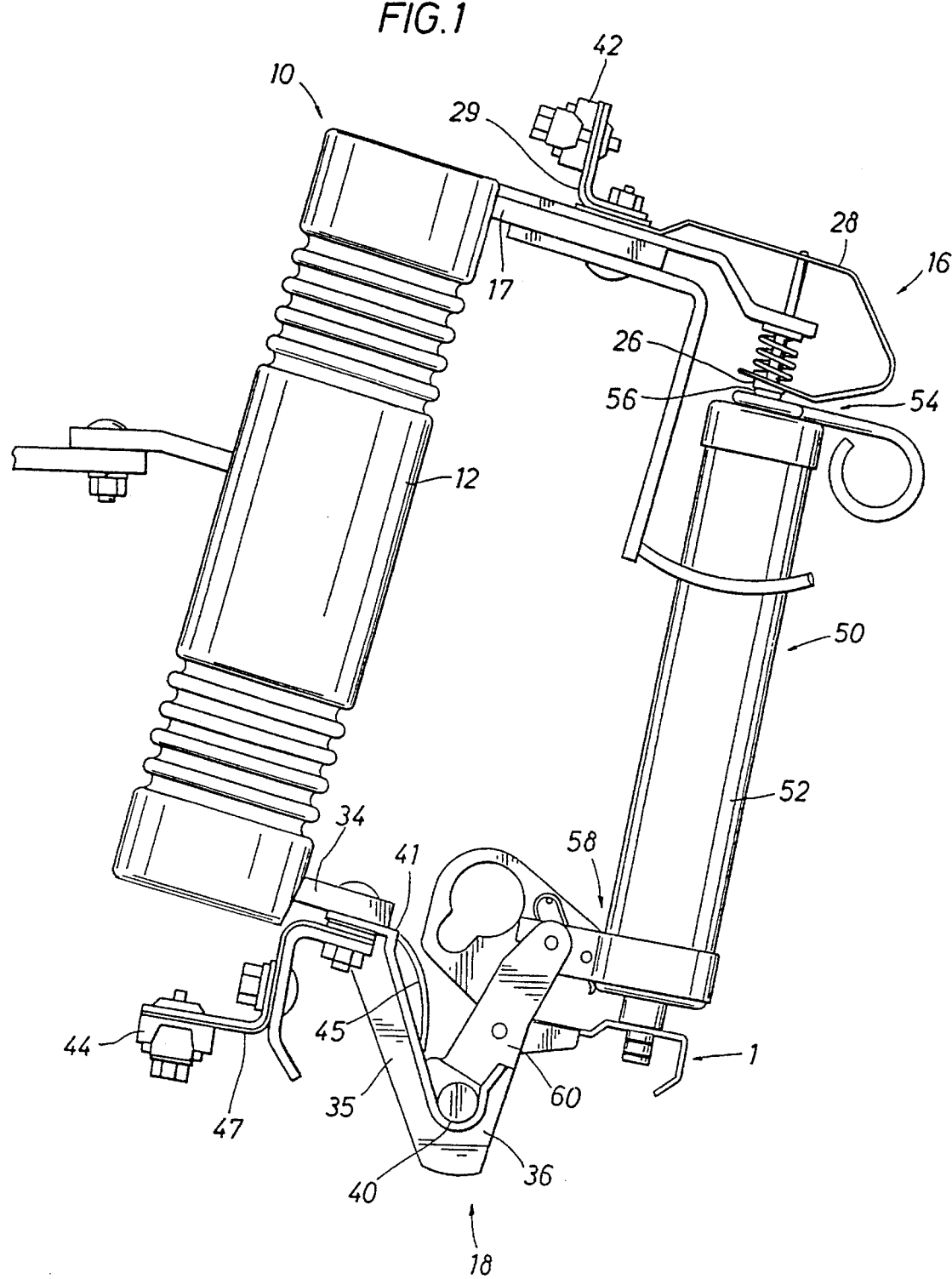
FIG. 1 is a side elevational view of a current-limiting dropout fuseholder of the present invention mounted in a conventional interchangeable cutout mounting.

The current limiting dropout fuseholder 50 of the present invention is shown in FIG. 1 as installed in a conventionally known interchangeable cutout mounting 10. Cutout mounting 10 generally comprises insulator 12 and upper and lower terminal assemblies 16 and 18, respectively, which are mounted on opposite ends of insulator 12 on upper and lower terminal support members 17 and 34. Upper terminal assembly 16 generally includes terminal pad 42, for receiving and clamping an electrical line conductor (not shown), conducting strap 28 and a cup contact 26 which is integrally formed in conducting strap 28. Conducting strap 28 electrically interconnects cup contact 26 and terminal pad 42 through terminal shunt 29. Lower terminal assembly 18 generally includes terminal pad 44, current shunt 47 and mounting hinge 35. Hinge 35 includes a pair of hanger arms 36 and is formed of brass or another electrically conducting material. Formed within arms 36 are U-shaped elbows 40 for supporting fuseholder 50. Attached to upper surface 41 of mounting hinge 35 are conducting spring clips 45 biased against the hinge assembly of the fuseholder 50 to insure good electrical contact. Terminal pad 44 is provided for receiving and clamping an electrical line conductor (not shown). Lower current shunt 47 provides good electrical contact between mounting hinge 35 and lower terminal pad 44.

In the preferred embodiment, fuseholder 50 comprises a full range, current limiting dropout fuseholder, similar to that described and claimed in co-pending U.S. patent application, Ser. No. 07/946,961, filed Sep. 17, 1992, the entire disclosure of which is incorporated herein by reference. That application discloses a new and unique current limiting fuse and dropout fuseholder which possesses many significant advantages over prior art fuses and fuseholders, such as, for example, by providing a full range of current interruption without the hazards and nuisances associated with prior-art expulsion fuses. Further, the fuse and fuseholder of Ser. No. 07/946,961 may be made much smaller and more compact than even prior art current limiting fuses, enabling the fuseholder to be employed in locations having relatively small mounting spaces or clearances.

Fuseholder 50 of the present invention is intended for generally lower current-rated fuseholder applications, such as those rated 12 amps and below, and generally comprises fuse body 52 having upper cap assembly 54 and lower cap and hinge assembly 58. Upper cap assembly 54 includes a top contact 56. Lower cap and hinge assembly 58 includes a conducting hinge member 60 which, as described below, is interconnected such that there exists a continuous current path through fuse body 52 between hinge member 60 and top contact 56. Top contact 56 is disposed within the recess of cup contact 26, and hinge member 60 is engaged by hanger arms 36 of cutout mounting 10.

Figure 2:
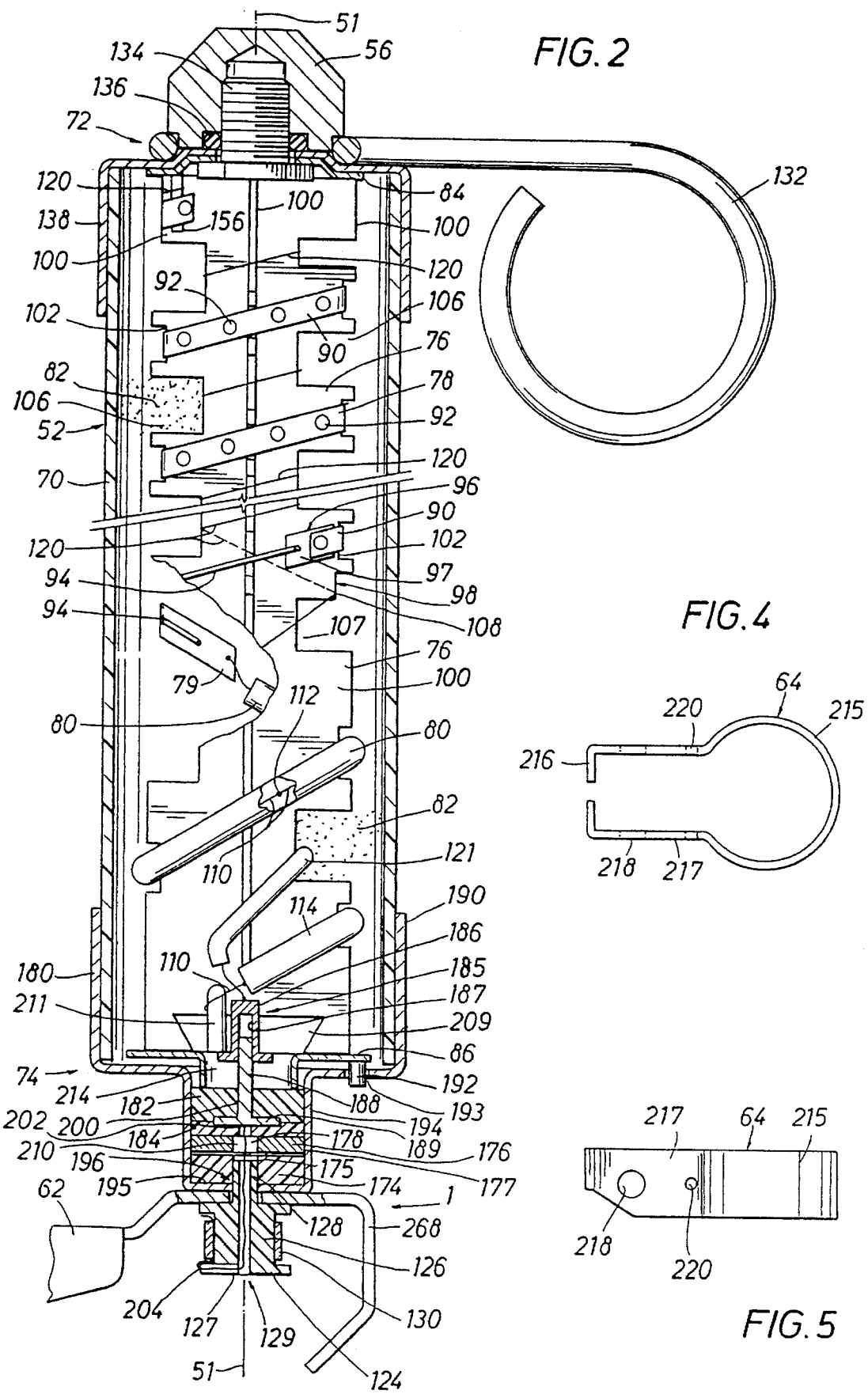
FIG. 2 is a cross-sectional view of the fuse body of the current-limiting fuseholder shown in FIG. 1.

Referring now to FIG. 2, fuse body 52 includes an insulative cartridge or fuse tube 70 disposed about longitudinal fuse axis 51. A high current fusible element 78 and a low current fusible element 80 are housed in fuse tube 70 and are connected in series between upper and lower element terminations 84, 86 respectively. Fuse tube 70 is a generally tubular member which is closed at its ends by upper and lower closures 72, 74, respectively. Fuse body 52 houses an insulative supporting structure known as a spider 76 which supports fusible elements 78 and 80. High purity silica sand 82 or other materials having suitable interrupting and insulation characteristics surrounds spider 76 and fusible elements 78, 80 and fills the unused volume within fuse body 52. Spider 76 is made of an inorganic mica and it includes four arms 100 radiating from the longitudinal axis 51, three of arms 100 being visible in FIG. 2. Evenly spaced along the length of each arm 100 are element support surfaces 102.

Upper and lower element terminations 84, 86 respectively are formed of a conducting material, preferably copper, and serve as supports for arms 100 of spider 76 and as landings and termination points for fusible elements 78, 80 and for the upper end of auxiliary wire 120 as described below. Element terminations 84, 86 include angular tabs 209 for maintaining the separation between spider arms 100.

Figure 13:
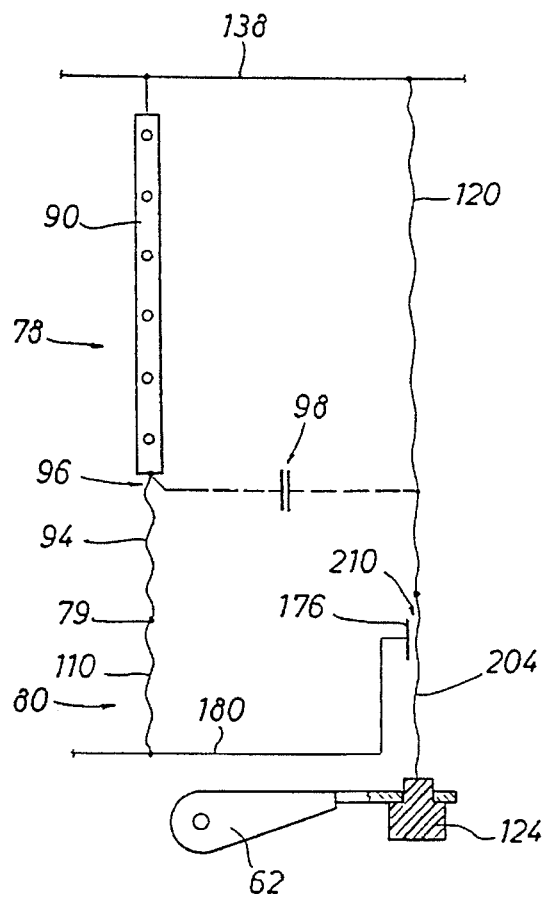
FIG. 13 is a diagram in schematic form showing the multiple current paths through the fuseholder of FIG. 1.

Referring to FIGS. 2 and 13, high current fusible element 78 itself comprises a series combination of two elements: a first ribbon element 90 and a series-connected wire element 94. Ribbon 90 and wire 94 are interconnected by series connection 96, formed by a copper conducting strap 97 that is supported on spider 76, ribbon 90 and wire 94 each being soldered to strap 76. The upper end of ribbon 90 is soldered to conducting tab 156 on upper element termination 84.

In the preferred embodiment, both the ribbon element 90 and wire element 94 are made of silver, although other electrically conducting materials may be employed. Silver ribbon 90 has a width within the range of approximately 0.125 to 0.25 inches, and preferably is 0.188 inches. The thickness of ribbon 90 should be between approximately 0.002 to 0.006 inches. The cross-sectional area of ribbon element 90 is significantly reduced at spaced-apart locations along its length by means of holes that are formed through the ribbon's thickness forming reduced area portions 92. As an alternative to holes, notches may be formed along the edges of ribbon 90, or other means may be used to remove conducting material from the element 90 and thereby reduce the cross-sectional area. As described in copending application Ser. No. 07/946,961, in order to allow fuseholder 50 to be manufactured with a reduced overall length and diameter, reduced area portions 92 are positioned between spider arms 100 and are spaced apart from element support surfaces 102 and from the fuse tube 70. For example, it is preferred that the center of reduced area portions 92 be at least approximately 0.18 inches from element support surfaces 102 of spider arms 100. It is also preferred that the clearances between the center of reduced area portion 92 and the inside wall 71 of fuse tube 70 be between approximately 0.18 and 0.25 inches, 0.23 inches being the most preferred clearance, as measured along a radius from fuse axis 51.

The wire element 94 of high current fusible element 78 is selected to have the same $I^2T$ melting characteristics along its entire length as the $I^2T$ melting characteristics of the reduced area portions 92 of ribbon element 90. In other words, a wire element 94 is selected such that the same current that causes reduced area portions 92 of ribbon 90 to melt will also cause the entire length of wire element 94 to melt. Where element 90 and element 94 are both made from material having the same resistivity, such as where they are both made form silver as is preferred, then the $I^2T$ melting characteristics of reduced area portions 92 and wire element 94 may be matched by selecting a wire element 94 that has a cross-sectional area substantially equal to the cross-sectional area of the ribbon element 90 at the reduced area portions 92. The length of wire element 94 is selected so as to be not greater than 50 % of the length of the entire high current fusible element 78. It is preferred that the wire element 94 have a length of approximately 30% of the length of the entire high current fusible element 78. The series-connected ribbon element 90 and wire element 94 are helically wound on the element support surfaces 102 of the spider arms 100 and connected in series with the low current fusible element 80, which is also helically disposed about the spider arms 100.

Referring still to FIGS. 2 and 13, the series connector between wire element 94 and low current fusible element 80 is formed by copper conducting strap 79 which is supported on spider 76. Low current fusible element 80 is designed to operate at a predetermined current level below that level at which high current fusible element 78 is designed to operate. Depending on the current rating of the fuseholder 50, low current fusible element 80 is comprised of one or more parallel connected conducting wires 110 (one shown in FIG. 2), which are preferably formed of silver or other good electrically conductive material and insulated in a silicone rubber covering 114. The covered wire 110 is then helically wrapped about the lower section of spider 76. One end of wire 110 is attached to conducting strap 79 at termination point 116 by soldering. The other end of wire 110 is conductively attached to tab 211 of lower element termination 86 also by soldering.

Wire 110 of fusible element 80 is made from two approximately equal lengths of wire that are soldered together as at junction 112 with a solder having a substantially lower melting temperature than that of wire 110. The electrically conductive material used for wire 110 or the solder used at junction 112 has thermal characteristics causing it to melt at a temperature consistent with the time-current characteristic requirements of the fuse. Although junction 112 is completely insulated by covering 114, for clarity, wire 110 is depicted in FIG. 2 with a portion of covering 114 cut away.

Also disposed within fuse body 52 is auxiliary wire 120. Preferably, auxiliary wire 120 is formed of silver for higher current rated fuses and a conductor of higher electrical resistivity such as nichrome for lower current rated fuses. Auxiliary wire 120 is wound about spider 76 in notches 106 which are formed in spider arms 100 between element support surfaces 102. Notches 106 are formed in spider arms 100 preferably to a depth 0.25 inches below the element support surface 102. As shown, auxiliary wire 120 is generally concentrically disposed within the helix formed by ribbon 90, and wires 94, 110. In this fashion, auxiliary wire 120 does not contact ribbon 90, or wires 94,110 except, as described below, near its upper point of termination.

A turn of auxiliary wire 120 closest to interconnection point 96 is disposed so as to be in close proximity to interconnection point 96, forming a spark gap 98 therebetween. Preferably, spark gap 98, as measured between interconnection point 96 and auxiliary wire 120 at their closest point is approximately 0.12 inches. To form spark gap 98, auxiliary wire 120 is disposed on spider arm segment 108 of notch 107. Segment 108 is adjacent to the element support surface 102 that is closest to interconnection point 96, and has a reduced depth relative to the remainder of notch 107, thereby raising wire 120 to the proper spacing from ribbon element 90 and wire element 94. As an alternative to manufacturing spider 76 with a shallow segment 108 on notch 107, an insulative extension (not shown) may be clipped or otherwise fastened to spider arm 100 adjacent to interconnection point 96. In this case, auxiliary wire 120 is positioned on the extension at the distance away from interconnection 96 necessary to form spark gap 98 having the proper dimension. Alternatively, an electrically conductive clip (not shown) may be positioned so as to be in contact with the auxiliary wire 120 at one point and having an opposite end forming a spark gap 98 of the proper dimension to interconnection point 96.

A lower segment 121 of auxiliary wire 120 is insulated in a silicone rubber covering as it enters the space occupied by the helix formed by wire 110 of low current fusible element 80. The upper end of auxiliary wire 120 is soldered to tab 156 on upper element termination 84. The lower segment 121 of auxiliary wire 120 terminates on ranged receptacle 186 which is made of brass or other conducting material and retained in a central recess 185 formed along fuse axis 51 in the lower end of spider 76. A conducting insert 188 is inserted into receptacle 186 and is electrically connected to a trigger wire 204 which preferably is made of high strength and high electrical resistance nichrome. Trigger wire 204 extends outside of fuse body 52 through lower closure 74. Conducting receptacle 186, insert 188 and trigger wire 204 are all electrically insulated from lower closure 74.

As best shown in FIG. 2, upper cap assembly 54 generally comprises top contact 56, pull ring 132, top end cap 138 and upper element termination 84, all of which are attached and their positions relative to one another maintained by the use of a single fastener, stud 134. An o-ring seal 136 is disposed about stud 134 between top contact 56 and end cap 138. Stud 134 includes a central longitudinal bore (not shown) to permit filling of fuse tube 70 with sand 82 upon assembly of fuseholder 50.

Lower closure 74 generally comprises bottom end cap 180, lower element termination 86, seal member 182, positioner 184, conductive washer 176 and insulative spacer 174. Bottom end cap 180 is formed of copper alloy or other conducting material and generally includes a cylindrical body portion 190 disposed about fuse tube 70, and a generally cylindrical reduced diameter extension 194 attached to and extending from the center of cylindrical body portion 190 thereby forming an interior recess within extension 194. Extension 194 and body 190 are generally coaxially aligned with fuse axis 51. An aperture 196 is formed substantially in the center of lower surface 195 of extension 194 at the intersection with axis 51.

Lower element termination 86 includes central aperture 214 which is substantially aligned with fuse axis 51, and further includes conducting tab 211 which serves as a landing and termination point for wire 110 of low current fusible element 80 as shown in FIG. 2. Lower element termination 86 is electrically connected to bottom end cap 180 by means of conducting tab 192. Tab 192 is formed on and extends from element termination 86 through hole 193 formed in bottom end cap 180. The portion of tab 192 extending through end cap 180 is bent over and soldered to cap 180.

Coaxially disposed within the central recess of end cap extension 194 are insulative spacer 174, conductive washer 176, wire positioner 184 and seal member 182. Seal member 182 comprises a rubber washer having central aperture 200. Wire positioner 184 comprises an insulative washer made of mica or nylon or other insulating material and includes central aperture 202. Washer 176 is preferably made of an electrically conducting material and includes a central aperture 178 and an outer edge surface 177 which engages the walls of extension 194 so as to create a current path therethrough. Insulative spacer 174, which may be made of rubber or nylon, for example, includes a central aperture 175. Trigger wire 204 is brazed or soldered to conducting insert 188 which preferably is formed of brass. Insert 188 includes flange 189 which is disposed between seal member 182 and positioner 184. Aperture 202 of wire positioner 184 has a diameter that is smaller than the diameter of aperture 178 of conducting washer 176 so as to centrally position trigger wire 204 in aperture 178.

Receptacle 186, adapted to receive and electrically engage insert 188, is disposed through central hole 214 in lower element termination 86 and is retained in central recess 185 in the lower end of spider 76. Receptacle 186 is attached to, and in conducting engagement with, auxiliary wire 120 as previously described, but does not contact element termination 86. Conducting insert 188 is inserted into conducting receptacle 186 through hole 214 of lower element termination 86 during assembly of fuse body 52 with trigger wire 204 extending out of fuse body 52 through aperture 196 in end cap 180, passing through apertures 175, 178,202,200 of spacer 174, conducting washer 176, positioner 184, and seal 182, respectively. The lower segment 121 of auxiliary wire 120, receptacle 186, insert 188 and trigger wire 204 are all electrically insulated from lower cap and hinge assembly 58. A spark gap 210, which preferably is approximately 0.040 inches for all voltage and current ratings for fuseholder 50, is thus formed between trigger wire 204 and washer 176.

Figure 3:
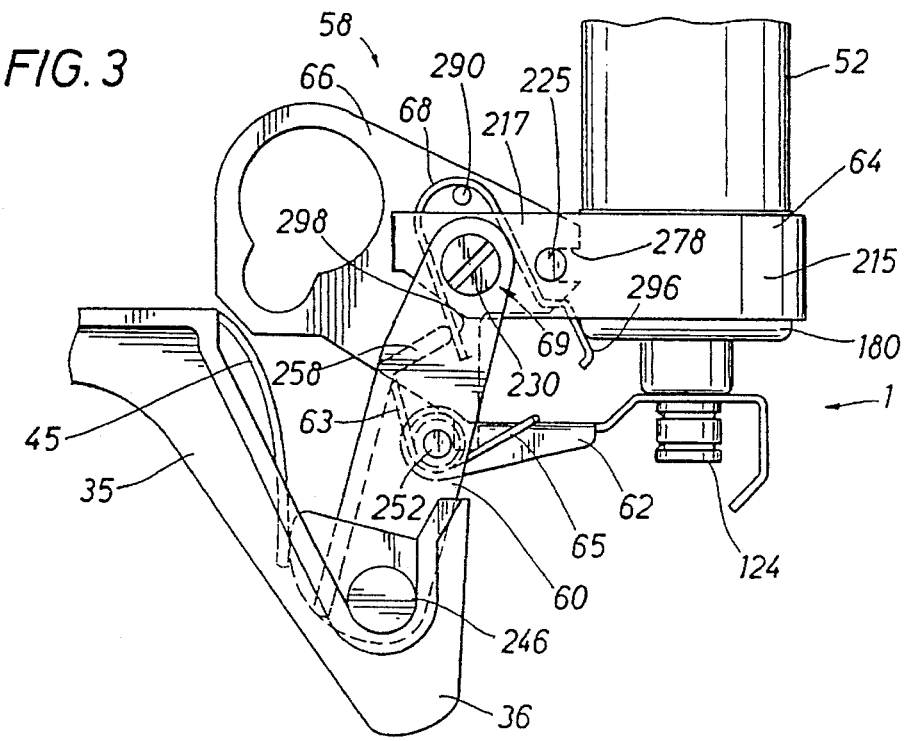
FIG. 3 is a side elevational view of the lower cap and hinge assembly of the fuseholder shown in FIG. 1.

Lower cap and hinge assembly 58 of fuseholder 50 generally includes hinge member 60, latch 62, latch plate 66, spring 63, current interchange 68, sleeve 69 and connective member 64. Referring now to FIGS. 3–5, connective member 64, functions like a clamp and generally includes a strap portion 215 and a pair of hinge supporting members 217 attached thereto. The ends 216 of hinge supporting members 217 are bent toward one another and formed at substantially right angles to hinge supports 217. Two pairs of aligned holes 218,220 are formed in hinge supporting members 217. As best shown in FIG. 3, fastener 225 is disposed through aligned holes 220 in order to draw together hinge supporting members 217 and to secure and clamp strap portion 215 of connective member 64 about bottom end cap 180.

Figure 6:
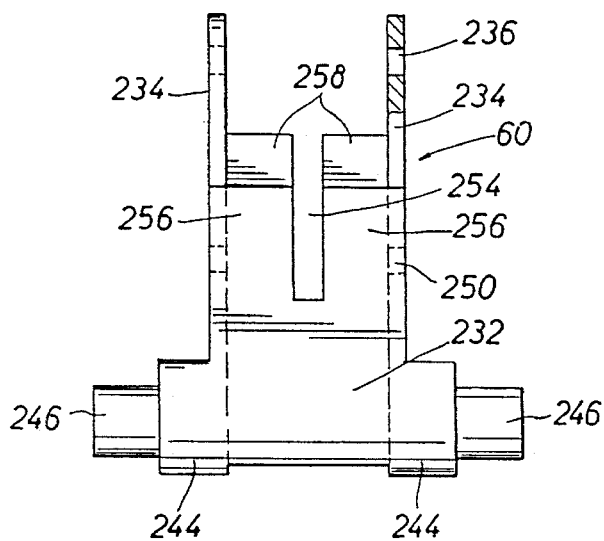
FIG. 6 is a top view of the hinge member of the lower cap and hinge assembly shown in FIG. 3.
Figure 7:
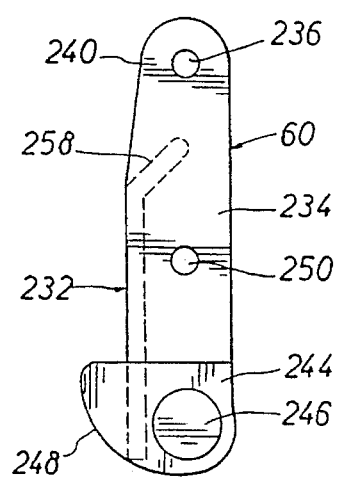
FIG. 7 is a side elevational view of the hinge member shown in FIG. 6.

Referring to FIGS. 3, 6 and 7, hinge member 60 generally comprises base portion 232 and a pair of outwardly extending side members 234. Side members 234 include tapered edge 240, shoulder 244 and two pairs of aligned holes 236, 250. Holes 236 are formed through side members 234 adjacent tapered edge 240. Shoulder portions 244 have trunions 246 extending outwardly therefrom and include cam-like electrical contact surfaces 248 adapted for electrical engagement with conducting spring clips 45 of mounting hinge 35 shown in FIGS. 1 and 3. Holes 250 are formed in side members 234 between holes 236 and shoulders 244. Base 232 extends between side members 234 and includes slot 254. Slot 254 generally bisects base 232 forming a pair of leg portions 256. Legs 256 include ends 258 which extend outwardly from base 232 at an angle which is substantially equal to 45° and form a shoulder which engages and supports one end of the current interchange 68, best shown in FIG. 3.

Figure 8:
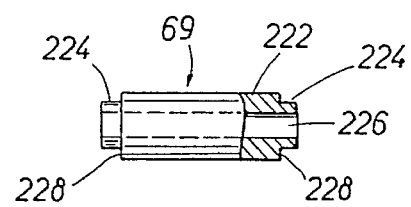
FIG. 8 is a side elevational view, partly in cross-section, of the sleeve for the lower cap and hinge assembly shown in FIG. 3.

Referring now to FIGS. 3 and 8, sleeve 69 generally comprises a cylindrical body 222 having reduced diameter portions 224 at each end, forming shoulders 228. A central bore 226 is longitudinally formed through sleeve 69. Reduced diameter portions 224 are disposed in holes 218 of hinge supporting members 217 of connective member 64 (FIG. 4) such that members 217 abut shoulders 228. Sleeve 69 provides a spacing means to maintain the proper separation between hinge supporting members 217 and provides a bearing means for a pin 230, which is disposed through central bore 226 and which supports hinge member 60 (FIG. 3).

Figure 10:
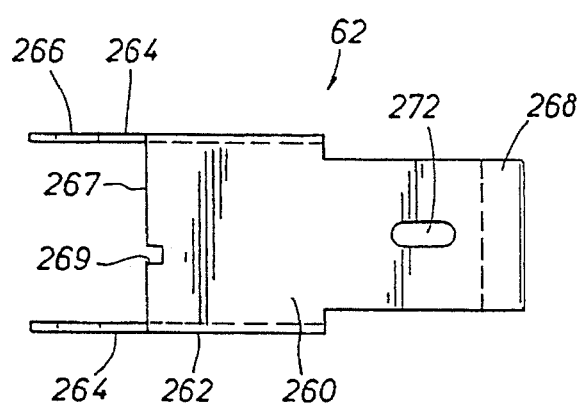
FIG. 10 is a top view of the latch shown in FIG. 9.
Figure 9:
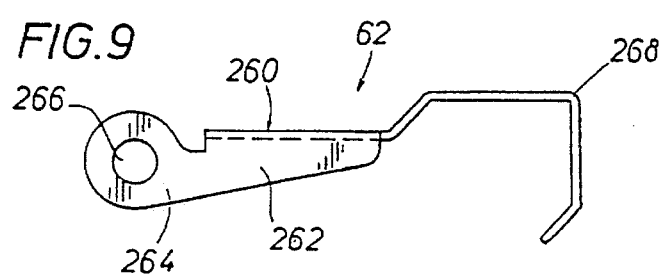
FIG. 9 is a side view of the latch member of the lower cap and hinge assembly shown in FIG. 3.

As best shown in FIGS. 3, 9 and 10, latch 62 generally comprises base 260, side members 262, and fuse restraining end 268. Side members 262 are attached to, and extend substantially perpendicularly from, base 260. Side members 262 include ears 264 having aligned holes 266 formed therein. Pin 252 (FIG. 3) is disposed through aligned holes 266 such that latch 62 is rotatably mounted about pin 252. Spring 63 is also mounted around pin 252 between side members 262 to bias latch 62 to rotate about pin 252 in a clockwise direction as viewed in FIG. 3. Base 260 of latch 62 includes latching surface 267 extending between sides 262 for engaging latch plate 66 as described in more detail below. A notch 269 is formed in latching surface 267 for receiving spring arm 65 of spring 63, best shown in FIG. 3. The free end of latch 62 comprises fuse retaining end 268 which includes elongate aperture 272. Latch member 62 is preferably made of stainless steel, although any conductive or insulative material having sufficient rigidity and strength may be employed.

Referring again to FIGS. 2 and 3, latch 62 is retained in a latched or supporting position beneath end cap 180 by trigger wire 204 and bobbin 124. Bobbin 124 is made of nylon or other insulative material and generally comprises a spool-shaped body 126 and an annular extension 128 attached to body 126. A central aperture 129 is formed through body 126 and extension 128. Upon assembly of fuseholder 50, fuse retaining end 268 of latch 62 is rotated into a supporting position against extension 194 of bottom end cap 180. Aperture 272 in retaining end 268 of latch 62 is in the form of a slot to allow the annular extension of bobbin 124 to properly align with the fuse axis 51. Annular extension 128 of bobbin 124 is disposed through aperture 272 in latch 62 and the end of trigger wire 204 extending from fuseholder 52 is disposed through central bore 129 of bobbin 124. Trigger wire 204 is then bent and pressed into a radially formed groove 127 in lower surface of spool body 126 and held in place against the sides of body 126 by clamping band 130. When so attached, latch surface 267 of latch 62 engages latching surface 276 of latch plate 66 to retain hinge member 60 and connective member 64 in fixed angular relationship to one another in a "contracted" and "charged" position, and prevent rotation about the joint means, i.e., pin 230 and sleeve 69.

Figure 11:
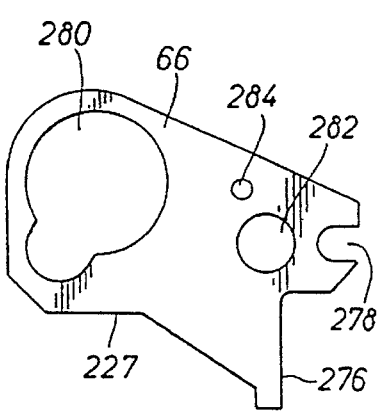
FIG. 11 is a side elevational view of the latch plate of the lower cap and hinge assembly shown in FIG. 3.

Now with reference to FIGS. 3 and 11, latch plate 66 is a generally flat metal plate having a projecting latch surface 276 for engaging latching surface 267 of latch 62 (FIG. 10). Latch plate 66 further includes a notch 278 for receiving fastener 225 of connective member 64, a key way 280 for use in installing and removing fuseholder 50 by "hot stick," and an aperture 284 for receiving pin 290 shown in FIG. 3. Latch plate 66 further includes aperture 282 for receiving body 222 of sleeve 69 which, as previously described, is disposed between hinge supporting members 217 of connective member 64. Pin 230 is disposed through central bore 226 of sleeve 69 and through holes 236 of hinge member 60. Latch plate 66 is received in slot 254 of hinge member 60 (FIG. 6) and includes a stop shoulder 227 for limiting its rotation on pin 230 through engagement with pin 252. The rotatable mounting of connective member 64 and latch plate 66 about sleeve 69, together with the inter-engagement of the fastener 225 within the notch 278 cause latch plate 66 to be non-rotatably anchored to connective member 64. This connection means causes latch plate 66 and connective member 64 to always rotate as a single unit along with fuse body 52 about the joint means, i.e. Pin 230 and sleeve 69.

Figure 12:
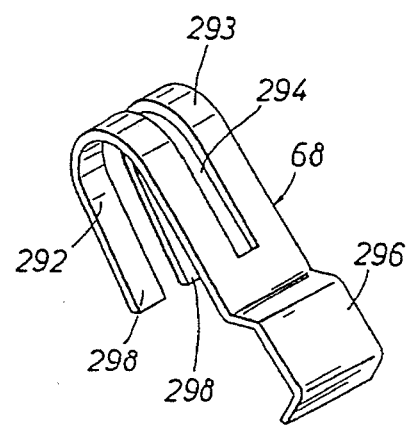
FIG. 12 is a perspective view of the current interchange of the lower cap and hinge assembly shown in FIG. 3.

Current interchange 68 is best shown in FIGS. 3 and 12. As shown, pin 290 is disposed through aperture 284 of latch plate 66 and provides support for current interchange 68. Current interchange 68 is preferably formed of phosphor bronze, a good electrical conducting material that is also suitable for use as a spring. Current interchange 68 includes a pair of U-shaped legs 292,293 separated by slot 294 and connected by segment 296. Current interchange 68 comprises a means for conducting current between bottom end cap 180 of fuse body 52 and hinge member 60. Legs 292,293 straddle latch plate 66, and are supported on pin 290 which projects from latch plate 66. Connecting segment 296 electrically engages bottom end cap 180 while ends 298 of legs 292,293 electrically engage the ends 258 of legs 256 of hinge member 60. When engaged between fuse body 52 and hinge 60, current interchange 68 acts as a spring and imparts approximately 12 inch-pounds of torque between hinge 60 and fuse body 52 which assists hinge member 60 to rotate to its extended position to allow fuseholder 50 to drop out of engagement with cutout mounting 10.

Fuseholder 50 is shown in FIGS. 1 and 3 with hinge member 60 and connective member 64 in their contracted and charged position, and with latch 62 and latch plate 66 latched. So latched, fuseholder 50 is in its extended position and current is conducted from upper terminal 16 of cutout mounting 10 through fuseholder 50 to lower terminal assembly 18 by means of bottom end cap 180, current interchange 68, hinge member 60 and conducting spring clips 45 to mounting hinge 35 of lower terminal assembly 18.

Referring now to FIG. 13, the various current paths through fuseholder 50 are shown schematically. In general, at various times during operation of fuseholder 50, current will be conducted from top cap 138 to bottom cap 180 along three distinct current paths. The first path comprises the series connected high current and low current fusible elements 78, 80. The second current path is electrically in parallel with the first current path and comprises auxiliary conductor 120, trigger wire 204, spark gap 210 and conducting washer 176. The third current path is formed by ribbon element 90, spark gap 98, the lower portion of auxiliary wire 120, spark gap 210 and conducting washer 176.

Initially, during normal steady-state operation, that is, at current levels below the predetermined magnitudes at which fuseholder 50 is designed to operate, current is conducted through fuseholder 50 along the first current path because the impedance of the path formed by ribbon element 90, wire element 94 and low current wire element 110 is much less than any path that would include the relatively high impedance of either of the spark gaps 98 or 210. When an overcurrent of either the predetermined high or low magnitude occurs, one of the series-connected elements 78, 80 will begin to melt at one or more locations along the element's length, and an arc will form across the melted portions of the element.

In the case of a high magnitude fault, melting of the high current element 78 begins at the reduced area portions 92 of ribbon element 90 and, simultaneously, along the entire length of the wire element 94, the wire element 94 having substantially the same $I^2T$ melting characteristics as the ribbon element 90 at the reduced area portions 92. An electrical arc develops at each of the melted sections. These arcs give off tremendous heat which melts or fuses the sand surrounding those portions of the element experiencing the arc into glass-like tunnel structures called fulgurites. As fulgurites develop along the entire length of wire element 94 and in short sections at each reduced area portion 92 of ribbon element 90, the impedance of the current path formed by elements 78 and 80 increases, and the voltage across this impedance also increases accordingly. As best shown with reference to FIGS. 2 and 13, because edge 177 of conducting washer 176 is electrically connected to one end of the series combination of elements 78, 80 (the first current path) through lower end cap 180, and because trigger wire 204 is electrically connected to the other end of the series combination of elements 78, 80 through auxiliary wire 120, conducting receptacle 186 and insert 188 (the second current path), the voltage across the series combination of elements 78, 80 appears directly across spark gap 210. When the voltage across the first current path reaches the spark over level of gap 210, gap 210 will break down and begin to conduct, and the fault current is shifted from the increased electrical resistance of the first current path to the second current path having a low electrical resistance.

The high current now being conducted through the second current path quickly causes auxiliary wire 120 to begin to melt. The resistance in the second current path created as the fulgurite develops in the path of wire 120 gives rise to a voltage across elements 78, 80 of the first current path. As this voltage increases, the short fulgurite sections created in ribbon element 90 will reach their breakdown voltage level. However, the dielectric strength at the long fulgurite section formed about wire element 94 exceeds the voltage that can develop across adjacent sections of auxiliary wire 120.

Therefore, gap 98 will breakdown, and in conjunction with the short fulgurite sections in ribbon element 90, will form the final or third current path through fuseholder 50. When this occurs, the current is forced back into the remaining structure of high current ribbon element 90, such that the third current path ultimately conducts the fault current through high current ribbon element 90, across gap 98 and through the remainder of the auxiliary wire 120 and across gap 210 to the end cap 180. This shifting of fault current from the second current path to the third current path ensures that whatever current is conducted through fuseholder 50 between the time the current switches to the second current path and the time that the total interruption is complete will always be conducted across arc gap 210 to assist in severing trigger wire 204 as explained below.

Trigger wire 204 has a high resistance. When gap 210 breaks down and current is conducted through trigger wire 204, the high $I^2R$ heating through trigger wire 204, coupled with the heat generated by the arc across gap 210 will sever trigger wire 204, thereby acting as a release means for releasing and freeing latch 62 from retainment by trigger wire 204 and bobbin 124. When this occurs, fuse restraining end 268 of latch 62, no longer held in contact with bottom end cap 180, is biased away from end cap 180 by spring 63. The weight of fuseholder 50 and the forces imparted thereon by top terminal assembly 16 and conducting spring clips 45 of interchangeable cutout mounting 10 and the spring force from current interchange 68 will cause the lower cap and hinge assembly 58 to begin to collapse about pin 230 to an extended position, and cause the upper cap assembly 54 of fuse body 52 to drop out of engagement with top terminal assembly 16. When this occurs, fuse body 52 and lower cap and hinge assembly 58 will begin to rotate about trunion 246 in a clockwise direction as viewed in FIG. 3 until the fuseholder 50 reaches the dropout position and comes to rest on hanger arms 36 of interchangeable cutout 10.

The dropout position that results provides a clear and highly visible indication to linemen that the fuse has operated. Additionally, by causing the fuseholder 50 to drop out of engagement with interchangeable cutout mounting 10 upon the occurrence of an overcurrent, voltage stress is thus removed from the actuated fuse. This voltage stress could otherwise eventually lead to tracking along the outer surface of the fuseholder 50, and possible ultimate flash over between the upper and lower terminal assemblies 16 and 18 of interchangeable cutout mounting 10.

As apparent from the description above, dropout of fuseholder 50 is dependent upon the shifting of the fault current from fusible elements 78, 80 into auxiliary wire 120 such that trigger wire 204 is severed by the heat generated from the arc that is formed as current is conducted across spark gap 210. Thus, it is important from the standpoint of causing fuseholder 50 to drop open that auxiliary wire 120 not melt too quickly, but instead remain conductive long enough for the arcing across gap 210 to sever trigger wire 204.

The melting time of auxiliary wire 120 is dependant upon the magnitude of the current conducted through the wire, the size of the wire, and the material from which the wire is made. Each wire, then, has a different characteristic melting curve. Given two wires of the same material, one wire being larger than the other, the larger wire will not melt as quickly as the smaller wire for any fault current of a magnitude large enough to melt the wires. For a more specific example, a 0.0063 inch diameter NiCr wire will melt at approximately 0.035 seconds when experiencing a 6 amp current. By contrast, a larger 0.008 inch diameter NiCr wire will require approximately 0.3 seconds to melt when carrying the same current. Thus, by choosing a larger diameter wire as auxiliary wire 120, the arcing across gap 210 can be sustained for a longer period so as to ensure that trigger wire 204 is severed.

On the other hand, the dropout function is of secondary importance to the ability of fuseholder 50 to interrupt the flow of fault current and to do so before the dropout action of fuseholder 50 causes any significant separation between the upper contact assembly 54 of fuseholder 50 and the cup contact 26 of cutout mounting 10. As the current ratings of fuseholder 50 decrease, the level of current that the fuse must be capable of interrupting and the allowable let through current (let through $I^2T$) during interruptions under a at all fault current levels decreases accordingly. The size of auxiliary wires 120 used in higher current rated fuses can be relatively large without having any adverse affect on such fuses interrupting performance. On the other hand, the size of the auxiliary wires 120 normally used in high current-rated fuses can approach the size of the high current fusible element 78 used in lower current-rated fuses and, if used in such lower current-rated fuses, can adversely affect the interrupting performance by causing excessive let through $I^2T$ for these lower current-rated fuseholders 50. Also, even at the lowest level of current that these lower current-rated fuseholders 50 must interrupt, the trigger wire 204 will be severed within several 60 Hz cycles after the current is shifted to the second current path which includes auxiliary wire 120. In these cases, the auxiliary wire 120 must be small enough that it can melt and interrupt these lower level currents within the next several cycles of 60 Hz current flow. If the interruption is not accomplished within this time frame, an arc will develop between the separating upper contact assembly 54 of fuseholder 50 and the cup contact 26 of cutout mounting 10. This arc can cause the cutout mounting 10 to flashover. The requirements that dictate the size of the auxiliary wire 120 can be conflicting. On one hand, the wire must be large enough to allow completion of the severing of the trigger wire 204, while on the other hand the wire 120 must be small enough that it does not impede successful fault current interruption by the fuse. Difficulties in satisfying both requirements increase with lower current-rated fuses since mechanical requirements for the trigger wire 204 do not allow the size of trigger wire 204 to be reduced accordingly.

In higher current-rated fuses such as those rated 12 amps and above, those fuses being designed to continuously carry steady-state currents of 12 amps or more, no tension exists between the requirement that auxiliary wire 120 melt soon enough to interrupt the fault current and the desire to have spark gap 210 conduct long enough to sever trigger wire 204. On lower current-rated fuses, however, such as those rated 8 amps or less, the auxiliary wire 120 selected to properly interrupt all the various magnitudes of fault currents that may be experienced by fuseholder 50 must be relatively small. So constrained, wire 120 may melt too quickly, causing conduction across gap 210 to cease before trigger wire 204 has been severed. Accordingly, the use of wire element 94 in high current element 78 in conjunction with spark gap 98 adjacent to the interconnection of fusible elements 90 and 94 ensures that conduction occurs across gap 210 for a period of time long enough to sever trigger wire 204, when interrupting any level of fault current.

While the preferred embodiment of the invention has been shown and described, modifications thereof can be made by one skilled in the art without departing from the spirit and teachings of the invention. The embodiment described herein is exemplary only, and is not limiting. Many variations and modifications of the invention and apparatus disclosed herein are possible and are within the scope of the invention. Accordingly, the scope of protection is not limited by the description set out above, but is only limited by the claims which follow, that scope including all equivalents of the subject matter of the claims.

What is claimed is:

1. A fuse comprising:

a fuse body;

first and second conductive terminals on said body;

a first current path between said terminals comprising a first fusible element in series with a second fusible element, wherein said first fusible element includes spaced-apart portions having a reduced cross sectional area, and wherein said second fusible element has the same $I^2T$ melting characteristics as said reduced cross sectional area of said first fusible element;

a second current path between said terminals electrically in parallel with said first current path, said second current path comprising a conductor in series with a first spark gap; and a second spark gap between said first and second current paths.

2. The fuse of claim 1 wherein said second fusible element has a length not greater than 50% of the combined length of the series combination of said first and second fusible elements.

3. The fuse of claim 2 wherein said series combination of said first and second fusible elements comprises a high current fusible element, and wherein said first current path comprises a low current fusible element in series with said high current element.

4. The fuse of claim 1 wherein said first fusible element and said second fusible element are interconnected at a junction, and wherein said second spark gap is formed between said junction and said conductor of said second current path.

5. The fuse of claim 4 wherein said second spark gap is approximately 0.12 inches.

6. The fuse of claim 4 wherein said second fusible element has a length not greater that 50% of the combined length of said series combination of said ribbon element and said wire element.

7. The fuse of claim 1 wherein said second fusible element comprises a wire having a cross-sectional area substantially the same as said reduced cross-sectional area of said first fusible element.

8. A current limiting fuseholder comprising:

a fuse body;

a first and a second terminal on said fuse body;

a first and a second current path between said terminals; wherein said first current path comprises a high current fusible element in series with a low current fusible element; and wherein said high current fusible element comprises:

a first conductor having a plurality of spaced apart reduced area portions of reduced cross sectional area; and a second conductor in series with said first conductor, said second conductor having an $I^2T$ melting characteristic substantially the same as the $I^2T$ melting characteristic of said reduced cross sectional area of said reduced area portions in said first conductor.

9. The fuseholder of claim 8 wherein said second conductor has a substantially uniform cross-sectional area along its length, and wherein said cross-sectional area of said second conductor is substantially the same as the cross-sectional area of said reduced area portions of said first conductor.

10. The fuseholder of claim 9 further comprising a first spark gap between said first and second current paths.

11. The fuseholder of claim 10 wherein said first and second conductor of said high current fusible element are interconnected at a junction, and wherein said first spark gap in formed between said junction and said second current path.

12. The fuseholder of claim 8 wherein said second current path comprises an auxiliary conductor in series with a second spark gap.

13. The fuseholder of claim 11 wherein said first spark gap is approximately 0.12 inches.

14. A current limiting fuseholder comprising:

a fuse body;

a first and a second terminal on said fuse body;

a primary current path between said terminals for carrying substantially all of the normal steady-state current between said first and second terminals and for initially conducting an overcurrent through said fuse body, said primary current path comprising a fusible element;

a secondary current path between said terminals, said secondary current path being electrically in parallel with said primary current path and comprising an upper conductive portion in series with a lower conductive portion, said secondary current path having substantially higher impedance than said primary current path such that said secondary current path conducts substantially no steady-state current between said terminals;

a third current path between said terminals, said third current path comprising a first spark gap between said primary and secondary current paths;

first means for diverting the overcurrent from said first current path into said secondary current path;

second means for diverting the overcurrent from said secondary current path into said third current path.

15. The fuseholder of claim 14 wherein said first diverting means comprises a second spark gap in said secondary current path, said second spark gap preexisting any overcurrent condition.

16. A current limiting fuseholder comprising:

a fuse body;

a first and a second terminal on said fuse body;

a primary current path between said terminals for carrying substantially all of the normal steady-state current between said first and second terminals and for initially conducting an overcurrent through said fuse body, said primary current path comprising a fusible element;

said fusible element comprising a first conductor having a plurality of spaced apart reduced area portions of reduced cross sectional area and a second conductor in series with said first conductor, said second conductor having a cross sectional area substantially equal to said reduced cross sectional area of said reduced area portions in said first conductor;

a secondary current path between said terminals, said secondary current path being electrically in parallel with said primary current path and comprising an upper conductive portion in series with a lower conductive portion, said secondary current path having substantially higher impedance than said primary current path such that said secondary current path conducts substantially no steady-state current between said terminals;

a third current path between said terminals, said third current path comprising a first spark gap between said primary and secondary current paths;

first means for diverting the overcurrent from said first current path into said secondary current path, said first diverting means comprises a second spark gap in said secondary current path;

second means for diverting the overcurrent from said secondary current path into said third current path.

17. The fuseholder of claim 16 wherein said third current path further comprises said first conductor of said fusible element and said lower conductive portion of said second current path.

18. The fuseholder of claim 17 wherein said second conductor has a length not greater than 50% of the combined length of the series combination of said first and second conductors.

19. The fuseholder of claim 17 wherein said first and second conductors are connected at a junction, and wherein said first spark gap is disposed between said junction and said secondary current path.

20. The fuseholder of claim 15 wherein said lower conductive portion of said secondary current path has a higher resistance than said upper conductive portion of said secondary current path, and wherein said second spark gap is disposed between said lower conductive portion and one of said terminals.

21. The fuseholder of claim 16 wherein said first conductor comprises a ribbon element.

* * * * *